(12) United States Patent
Beet

(10) Patent No.: US 10,800,348 B2
(45) Date of Patent: Oct. 13, 2020

(54) AUTOMOTIVE TRAY ARRANGEMENT

(71) Applicant: PATRIOT CAMPERS PTY LTD., Molendinar (AU)

(72) Inventor: Jack Beet, Molendinar (AU)

(73) Assignee: PATRIOT CAMPERS HOLDINGS PTY LTD., Molendinar (AU)

( * ) Notice: Subject to any disclaimer, the term of this patent is extended or adjusted under 35 U.S.C. 154(b) by 37 days.

(21) Appl. No.: 16/181,418

(22) Filed: Nov. 6, 2018

(65) Prior Publication Data

US 2019/0135198 A1 May 9, 2019

(30) Foreign Application Priority Data

Nov. 6, 2017 (AU) ................................. 2017254984

(51) Int. Cl.
| | | |
|---|---|---|
| *B60R 11/06* | (2006.01) | |
| *B62D 33/02* | (2006.01) | |
| *B60R 11/00* | (2006.01) | |

(52) U.S. Cl.
CPC .............. *B60R 11/06* (2013.01); *B62D 33/02* (2013.01); *B60R 2011/004* (2013.01); *B60R 2011/0096* (2013.01)

(58) Field of Classification Search
CPC ... B60P 1/44; B60P 3/40; B60R 11/06; B62D 33/02

USPC ....................................................... 296/37.6
See application file for complete search history.

(56) References Cited

U.S. PATENT DOCUMENTS

| | | | | |
|---|---|---|---|---|
| 4,735,448 A | * | 4/1988 | Hart ......................... | B66D 1/00 |
| | | | | 254/323 |
| 9,272,740 B1 | * | 3/2016 | Portenier ............... | B62D 33/02 |
| 2007/0158968 A1 | * | 7/2007 | Chandler ................. | B60P 3/14 |
| | | | | 296/37.6 |
| 2011/0260486 A1 | * | 10/2011 | Thygesen .............. | B62D 33/02 |
| | | | | 296/26.09 |
| 2016/0107560 A1 | * | 4/2016 | Thygesen ................. | B60P 1/52 |
| | | | | 296/37.6 |
| 2018/0118129 A1 | * | 5/2018 | Smith ..................... | B60R 9/065 |
| 2018/0281699 A1 | * | 10/2018 | Furniss ..................... | B60P 3/14 |

OTHER PUBLICATIONS

Norweld Aluminum Ute Trays, retreived via Internet Archive Wayback Machine (as existed on Mar. 27, 2017), located at www.norweld.com.au/tray-bodies. (Year: 2017).*

* cited by examiner

*Primary Examiner* — Jason S Daniels
(74) *Attorney, Agent, or Firm* — Tucker Ellis LLP

(57) ABSTRACT

The present invention relates to an automotive tray arrangement. The tray arrangement includes a load-bearing tray. At least one toolbox is located beneath a tail of the tray. Advantageously, tools located in the toolbox can be readily located during an emergency.

20 Claims, 2 Drawing Sheets

AUTOMOTIVE TRAY ARRANGEMENT

RELATED APPLICATION DATA

This application claims priority to Australian Patent Application No. 2017254984 filed Nov. 6, 2017, which is hereby incorporated herein by reference.

TECHNICAL FIELD

The present invention generally relates to an automotive tray. The present invention has particular, although not exclusive application to a utility vehicle (i.e. a "ute").

BACKGROUND

The reference to any prior art in this specification is not, and should not be taken as an acknowledgement or any form of suggestion that the prior art forms part of the common general knowledge.

Utility vehicles ("Utes") are often used for four wheel driving and camping whereby camping gear is loaded onto the rear tray. In practice, it can be difficult to locate various items on the tray, particularly during an emergency.

The preferred embodiment provides for an improved tray arrangement.

SUMMARY OF THE INVENTION

According to one aspect of the present invention, there is provided an automotive tray arrangement including:
 a load-bearing tray; and
 at least one toolbox located beneath a tail of the tray.

Advantageously, tools located in the toolbox can be readily located during an emergency.

The at least one toolbox may include a pair of toolboxes located on either side of the tray. The toolboxes may include centrally locked doors. Each door may be folded. Preferably, each toolbox tapers upwardly toward a free end of the tray to provide improved clearance at the tail. Each toolbox may include a three-fold under-panel mounted beneath the tray. Each toolbox may be accessed from a side of the tray. Each toolbox may include a vertical partition. Each toolbox may include a horizontal shelf. Each door may provide access to one or more concealed utilities adjacent the tool box.

The arrangement may further include a headboard extending upwardly from a head of the tray. The headboard may include at least one concealed compartment (e.g. toolbox or utilities compartment for winch solenoids, manual air controls, fuse boxes, fuel tank filler, etc.). The headboard may include a frame. The frame may be formed from sheet metal. The frame may define a passage for an exhaust stack. The arrangement may include an antenna. The headboard may include mesh. The mesh may be laser cut. The mesh may include a decal design. The headboard may include at least one accessory mount for mounting accessories (e.g. vehicle recovery gear such as traction ladders, hi-lift jack, spare tyre mounts, etc.). The headboard may include rear-facing lights (e.g. brakes, indicators, tail).

The tray may include at least one concealed utility area for concealing one or more utilities. The utilities may include a power supply (12 v and 240 v), compressed air supply, water storage, electric water pump, fuses, relays and/or air solenoids. Each area may include a cover forming part of a load-bearing platform of the tray.

The tray may include a winch located beneath a tail of the tray. The tray may include a rear fascia defining an aperture through which a line of the winch passes. The rear fascia may kick-in. The rear fascia may include recessed taillights. The arrangement may further include one or more bumperettes protruding from the fascia and for minimizing offroad damage. Each bumperette may be tapered. The tray may define chamfered tail corners. The tray may include one or more back-lit decals.

The tray arrangement may include a pair of oblique lateral wheel arches extending from the sides of the tray. Each wheel arch may be folded. The tray arrangement may be powder-coated to resist corrosion. The tray arrangement may be formed using lightweight aluminum sheet material. The tray arrangement may be retro-fitted to various ute types. The arrangement may be delivered in flat-pack form prior to assembly.

The tray may include a steel chassis. The tray may include a rear drawer.

According to another aspect of the present invention, there is provided an automotive tray arrangement including:
 a load-bearing tray; and
 at least one compartment located beneath a tail of the tray.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
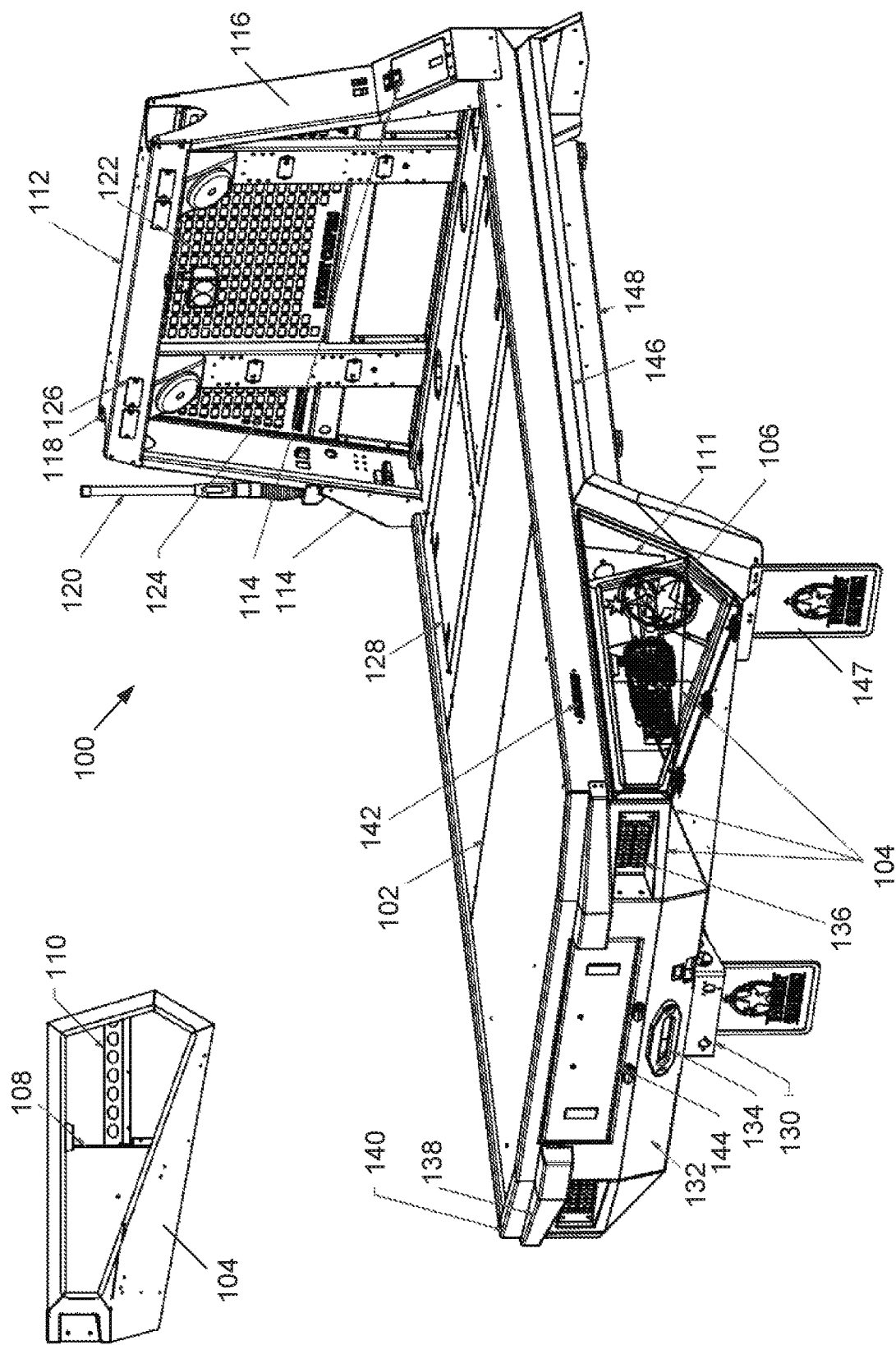
FIG. 1 is a perspective view of a tray arrangement in accordance with an embodiment of the present invention.

According to an embodiment of the present invention, there is provided an automotive tray arrangement 100 as shown in FIG. 1. The arrangement 100 includes a flat load-bearing tray 102, and a pair of toolboxes 104 located beneath a tail of the tray 102. Advantageously, tools located in the two toolboxes 104, located on either side of the tray 102, can be readily located during an emergency.

The toolboxes 104 include centrally locked doors 106 with a profile fold through. Each toolbox 104 tapers upwardly toward a free end at the rear of the tray 102 to provide improved clearance at the tail. Each toolbox 104 includes a three-fold under-panel mounted beneath the tray 102 and is accessed from a side of the tray 102. Each toolbox 104 includes a vertical partition 108 and a horizontal shelf 110. The door 106 also provides access to one or more concealed utilities 111 (e.g. fuel filler, compressed air outlet, water, etc.) adjacent the sealed tool box 104.

The tray arrangement 100 further includes a headboard 112 extending upwardly from a head of the tray 102. The headboard 112 includes a pair of lateral covered and concealed compartments 114 in the form of a toolbox or utilities compartment for winch solenoids, manual air controls, fuse boxes, fuel tank filler, etc. The headboard 112 includes a frame 116 in which the compartments 114 reside. The frame 116 is formed from sheet metal, avoiding the need for welding, and defines passages 118 for vehicle exhaust stacks. A CB radio antenna 120 is mounted to the frame 116.

The headboard 112 includes laser mesh 122, with a decal design, mounted to the frame 116. The headboard 112 also includes a pair of vertical strip accessory mounts 124 for mounting accessories such as vehicle recovery gear including traction ladders, hi-lift jack, spare tyre mounts, etc. The headboard 112 includes upper rear-facing tail lights 126 (e.g. brakes, indicators,).

The tray 102 also includes a pair of utility compartments 128 (or trays) for housing one or more utilities. The utilities may include a battery power supply (12 v and 240 v), compressed air supply, water storage, electric water pump, fuses, relays and air solenoids. Each compartment 128 includes a flush removable cover forming part of a load-bearing platform of the tray 102.

The rear of the tray 102 also includes a winch 130, located beneath a tail of the tray 102. The tray 102 includes a rear fascia 132 defining an aperture 134 through which a line of the winch 130 passes. The rear fascia 132 kicks-in underneath and includes recessed taillights 136. The arrangement 100 further includes tapered bumperettes 138 protruding from the fascia 132 and for minimizing offroad damage. The tray 102 also defines chamfered tail corners 140 and one or more safety back-lit decals 142. In addition, the tray 102 includes a rear storage drawer 144.

The tray arrangement 100 includes a pair of lateral folded wheel arches 146 extending from the sides of the tray 102 from which mud flaps 147 hang. The tray 102 also includes a steel chassis 148.

The tray arrangement 100 formed using lightweight aluminum sheet material and is powder-coated to resist corrosion. The tray arrangement is delivered in flat-pack form prior to assembly and can be retro-fitted to various ute types.

Figure 2A:
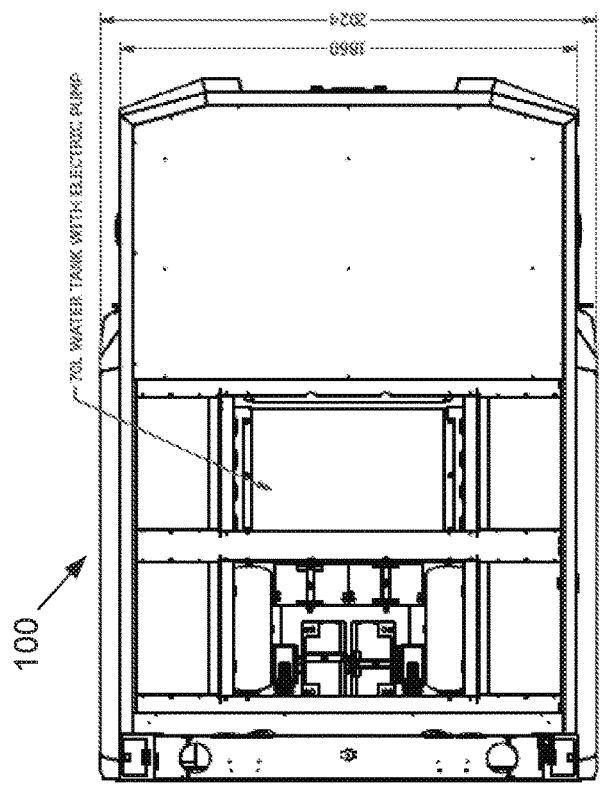
FIG. 2a is a top view of the tray arrangement of FIG. 1.
Figure 2B:
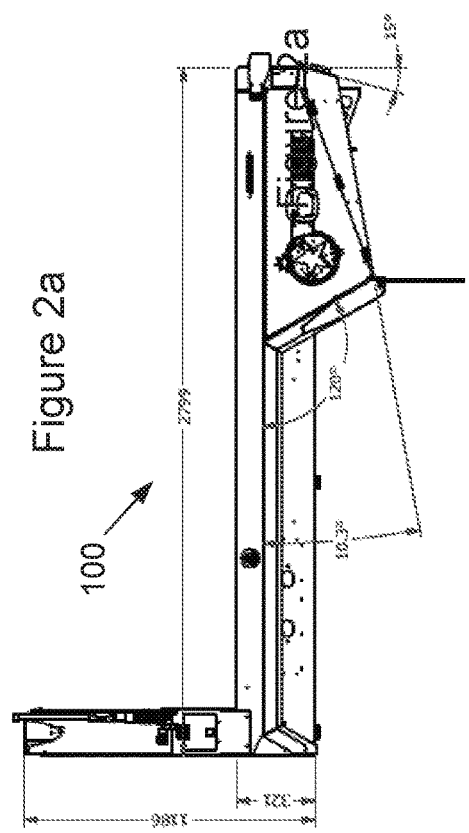
FIG. 2b is a side view of the tray arrangement of FIG. 1.
Figure 2C:
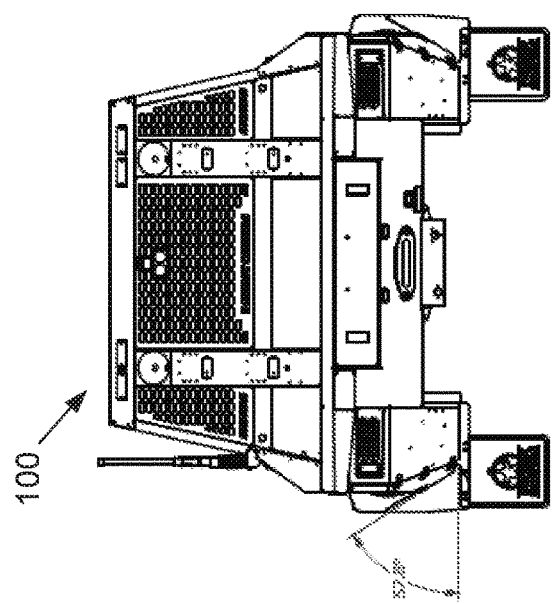
FIG. 2c is a rear view of the tray arrangement of FIG. 1.

FIG. 2 shows typical dimensions (in mm) and angles.

A person skilled in the art will appreciate that many embodiments and variations can be made without departing from the ambit of the present invention.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

What is claimed is:

1. An automotive tray arrangement including: a load-bearing tray;
   at least one toolbox located beneath a tail of the tray;
   a headboard extending upwardly from a head of the tray, wherein the headboard defines passages for vehicle exhaust stacks to pass there through.

2. An arrangement as claimed in claim 1, wherein the at least one toolbox includes a pair of toolboxes located on either lateral side of the tray.

3. An arrangement as claimed in claim 2, wherein the toolboxes include centrally locked doors.

4. An arrangement as claimed in claim 1, wherein each toolbox can be accessed from a lateral side of the tray.

5. An arrangement as claimed in claim 1, wherein the headboard includes at least one concealed compartment.

6. An arrangement as claimed in claim 1, wherein the headboard includes a frame spanned by mesh.

7. An arrangement as claimed in claim 5, wherein the headboard includes at least one accessory mount for mounting accessories.

8. An arrangement as claimed in claim 1, further including at least one concealed utility area for concealing one or more utilities beneath the tray.

9. An arrangement as claimed in claim 8, wherein each concealed utility area is covered by a cover forming part of a load-bearing platform of the tray.

10. An arrangement as claimed in claim 1, further including a winch located beneath the tail of the tray.

11. An arrangement as claimed in claim 1, further including a kicked-in rear fascia.

12. An arrangement as claimed in claim 11, wherein the rear fascia includes recessed taillights.

13. An arrangement as claimed in claim 1, further including one or more protruding bumperettes.

14. An arrangement as claimed in claim 1, further including a pair of wheel arches.

15. An arrangement as claimed in claim 14, wherein each wheel arch is folded.

16. An arrangement as claimed in claim 1, wherein the tray arrangement is formed using aluminum sheet material and delivered in flat-pack form prior to retro-fitting to an existing vehicle.

17. An automotive tray arrangement including: a load-bearing tray;
    at least one compartment located beneath a tail of the tray;
    a headboard extending upwardly from a head of the tray, wherein the headboard defines passages for vehicle exhaust stacks to pass there through.

18. An automotive tray arrangement including:
    a load-bearing tray;
    at least one toolbox located beneath a tail of the tray; and
    a headboard extending upwardly from a head of the tray, wherein the headboard includes at least one compartment concealed within the headboard.

19. An arrangement as claimed in claim 18, wherein the headboard includes at least one accessory mount for mounting accessories.

20. An arrangement as claimed in claim 1, where each toolbox includes a three-panel under-panel mounted beneath the tray and being accessed from a side of the tray.

* * * * *